UNITED STATES PATENT OFFICE.

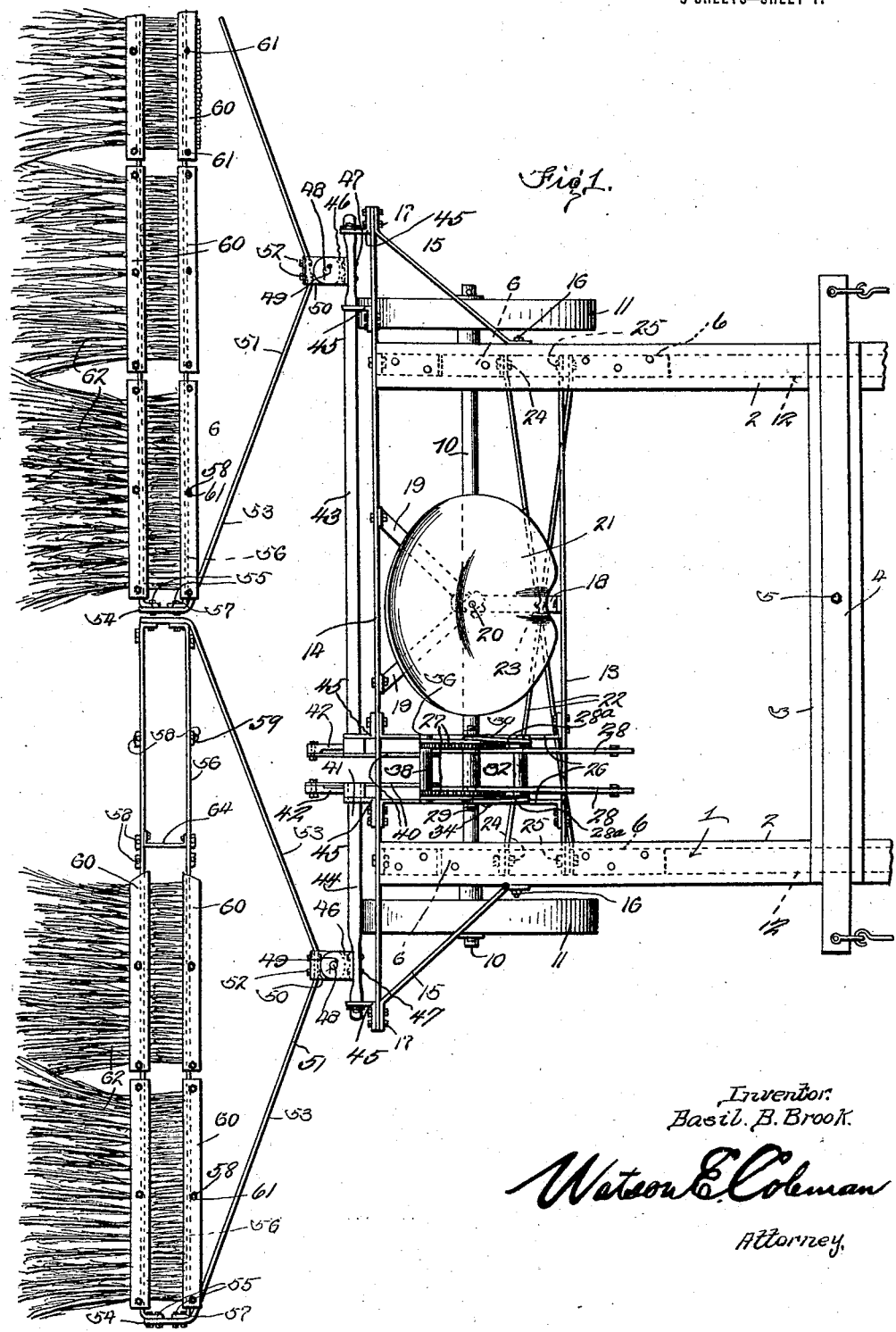

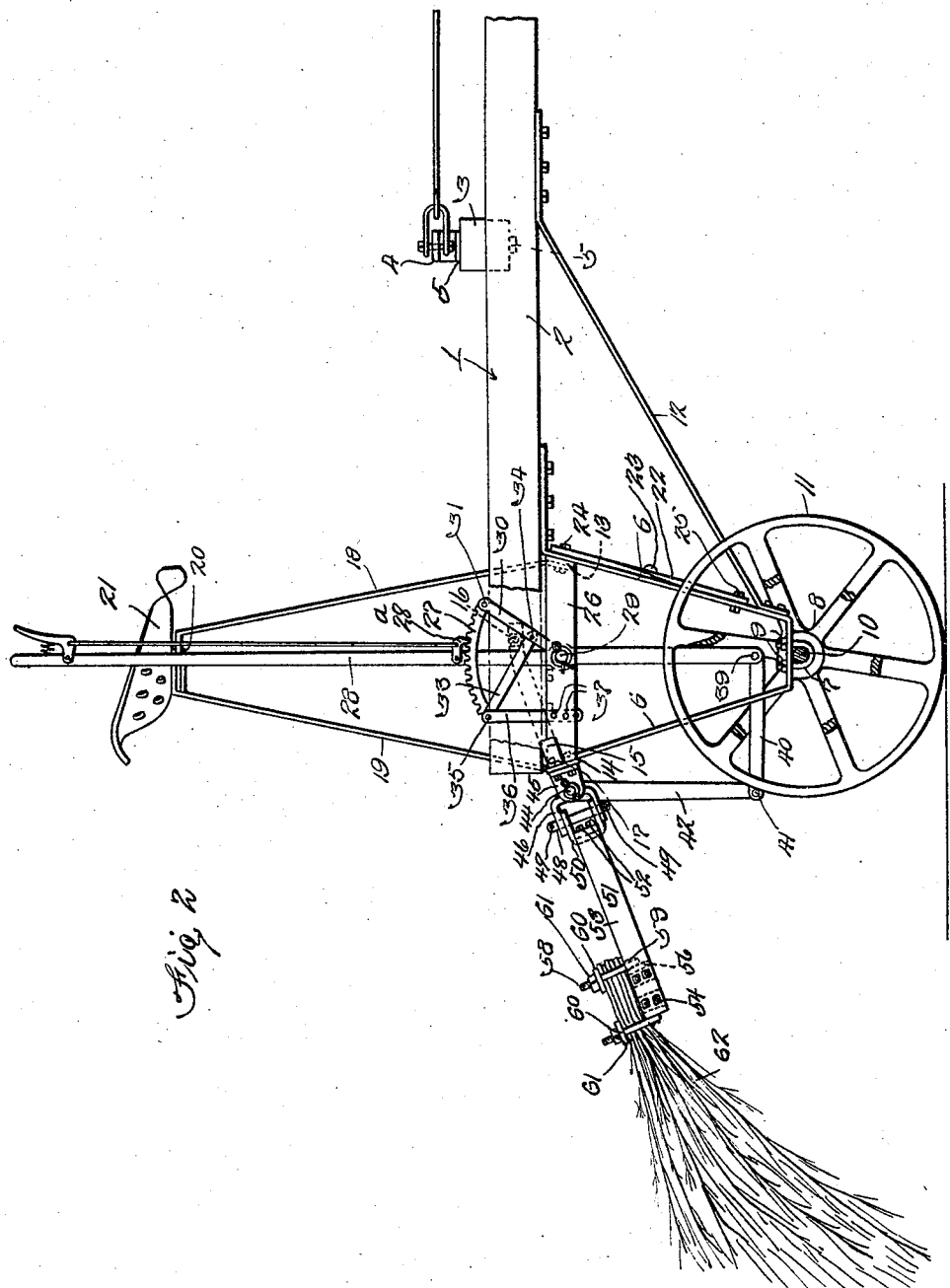

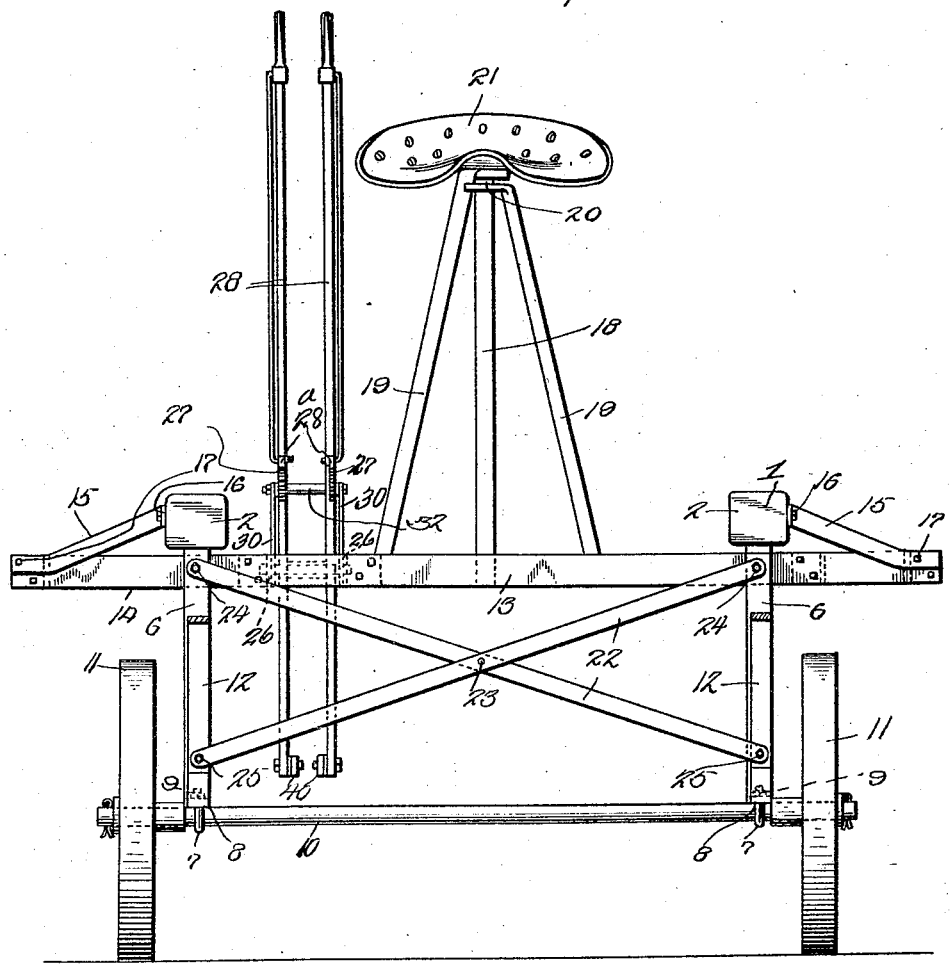

BASIL B. BROOK, OF ABERDEEN, WASHINGTON.

SOIL OR TURF RENOVATING BRUSH HARROW.

1,421,060.   Specification of Letters Patent.   Patented June 27, 1922.

Application filed June 8, 1921. Serial No. 475,895.

*To all whom it may concern:*

Be it known that I, BASIL B. BROOK, a citizen of the United States, residing at Aberdeen, in the county of Grays Harbor and State of Washington, have invented certain new and useful Improvements in Soil or Turf Renovating Brush Harrows, of which the following is a specification, reference being had to the accompanying drawings.

The present invention has for its purpose the provision of a plurality of brush units, with means for raising and lowering the units, for the purpose of regulating the pressure of the brushes on the turf or soil.

Another purpose embodies the provision of means for so mounting the brush units as to permit them to swing laterally, to not only permit of easy turning of the machine, but also enabling the machine to turn in a very small space.

A still further purpose is the provision of a machine of this general character, wherein the brush units may be actuated for breaking up the top dressing, and working the same into the turf or soil, filling up the depressions or holes or gulleys, and leveling the raised portions, to insure a level surface for planting grass seed.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved soil or turf renovating brush harrow constructed in accordance with the invention, showing the levers 28 as having been moved, with the brushes raised.

Figure 2 is a view in side elevation of the soil or turf renovating brush harrow showing one of the heels broken away to illustrate its mounting, and showing one of the beams broken to show the segment in the rear.

Figure 3 is a view in front elevation of the improved brush harrow, with the brushes in the rear removed.

Referring to the drawings, 1 designates the frame, which comprises the beams 2, which are connected by the transverse beam 3.

As shown in Figures 1 and 2, the plan and side elevation, a suitable draft beam 4 is pivotally mounted at 5 on the transverse beam 3, to facilitate the attachment of draft animals to the machine for traversing the machine over the turf or soil.

Depending from and bolted to the side beams 2 of the frame 1 are supports 6 for the supporting wheels. Staple bearings 7 pass upwardly through the lower ends 8 of the supports 6 and have nuts 9 for holding the staple bearings in place. The staple bearings straddle the supporting axle 10, on which the supporting wheels 11 are journaled. Braces 12 relatively reinforce the supports 6 of the frame 1.

Arranged transversely of the frame immediately below the side beams 2 and connecting the upper portions of the opposite sides of the supports are bars 13 and 14. The lateral extremities of the bar 14 are relatively reinforced to the side beams 2 of the frame 1, by the braces 15, which are bolted at 16 to the beams 2 and at 17 to the extremities of the bar 14.

Rising upwardly from the forward bar 13 and upwardly from the bar 14 are supports 18 and 19. The supports 19 not only incline toward the support 18, but are relatively convergent. The support 18 inclines toward the supports 19, and the upper ends of the supports 18 and 19 are laterally bent and fastened together as at 20, and in turn to a suitable seat 21 for the operator.

Intersecting braces 22 (which are secured together at their point of intersection as at 23) connect the forward upper parts of the supports 6. Bolts 24 connect the upper ends of the intersecting braces 22 to the upward forward parts of the supports 6, while bolts 25 connect the lower ends of the braces 22 to the lower portions of the supports 6. These braces 22 relatively reinforce the supports, to insure a rigid structure.

Connecting and being bolted to the transverse bars 13 and 14 are braces 26, which not only support the segments 27, but also support the brush actuating levers 28. A pivot pin 29 is mounted in bearings of the transverse braces 26, there being supporting links 30 on the pivot pin 29, and in turn connected to certain of the ends of the segments 27 as at 31. In fact the connection 31 is in the form of a fastening pin, which passes through a sleeve 32. Reinforcing links 33 are connected at 34 to the supporting links 30, and are in turn connected to the other ends of the segments 27 by means of a fastening pin 35. Supporting links 36 are also engaged with the fastening pin 35, and have their other ends connected at 37 to the braces 26. A sleeve 38 receives the fastening pin 35 thereby spacing the relatively connected parts. The brush operating levers 28 are pivotally mounted on the pivot pin 29, and connected to their lower ends as at 39 are links 40. The links 40 are in turn connected at 41 to the arms 42, which are fastened upon and movable with the adjacent ends of the shafts 43 and 44. These shafts are mounted in angle bearings 45, which are carried by the rear transverse bar 14.

U-shaped clevises 46 are secured at 47 to the remote end portions of the shafts 43 and 44, in order to rock with the shafts. Pivot pins 48 pass through the arms of the U-shaped clevises and have cotter pins 49 to hold them in position. The pivot pins 48 also pass through the arms of the U-shaped clevises 50, thereby pivotally uniting the last named clevises between the arms of the clevises 46. Bars 51 are secured at 52 to the clevises 50, and are bent as shown to provide divergent arms 53. The arms 53 of each bar 51 have rearwardly disposed extensions 54, to which the right angle ends 55 of the transverse brush clamping bars 56 are secured at 57. Bolts 58 are secured to the bars 56 as at 59, and are engaged through the metal straps 60, there being nuts 61 on the bolts 58, to clamp the bars 60 against the forward portions of the brushes 62. These brushes are designed to be made from any suitable hard branches, which are relatively straight, and are designed to be carefully selected, and are made into irregular brushes, the main portions of these branches or brushes being bunched together, and being clamped securely between the bars 56 and the bars 60. It will be noted that the bars 56 engage the heavy portions of the brushes edgewise, so as to insure a secure clamping action. It will be noted that there are two brush units, each made up of several smaller brushes. It is obvious that any number of brushes may be employed, and each brush may consist of any number of smaller brushes. The brushes may be any suitable length, and each unit may be any suitable width, and upon observation, it will be noted that the plan view of Figure 1 discloses one of the units or brushes removed, in order to show the transverse bars 56, which are relatively reinforced by means of the braces 64.

Also upon observation it will be noted that the machine may turn in a very small space, particularly due to the fact that the brushes are capable of being swung laterally. In fact one brush may assume a position to one side laterally, while the other brush may swing to a position, with one of the arms 53 in close position to the rear part of the machine, thereby enabling the brushes to properly position themselves, when the machine is turning in a small space.

Obviously by moving one of the levers 28, the brush on the left may be tilted upwardly, namely by moving such lever forwardly. Upon a rearward movement of one of the levers, its respective brush may be applied with increased pressure on the turf or soil. The operator when traversing the machine over the surface of the turf or soil, may actuate the levers as may be desired, to facilitate the operation of the brushes.

When moving the machine from one place to another it is the aim to raise the brushes entirely off the surface of the turf or soil, in order to insure easy turning, and in order to insure easy traveling of the machine. The pressure of the brushes may be relatively incleased, when it is desired to break up and thoroughly distribute the compost. Furthermore the machine may be easily taken apart, convenient to the manufacturer when packing and shipping the machine. The brush sections or units may be easily removed and replaced, and each unit or brush consists of three sections, in order to insure broad turf sweeping elements. It has been found that the outside sections of the brushes or units wear out more rapidly than the inner sections, therefore the inner sections are used to replace the outer sections, as the sections of the brushes are renewed. While the branches forming the brushes are designed to be relatively straight, it is the aim to provide an irregular brush, in order to attain the best results, in breaking up the top dressing, and working the same into the turf.

When renovating the turf or soil, or when reseeding old or worn turf, the present form of turf renovating harrow has been found invaluable. For instance the turf is first provided with a supply of lime, which is swept into the turf with the present form of machine. After a few days the grass seed is sowed, and subsequently a top dressing of decayed manure or compost is applied. This top dressing is then thoroughly harrowed or swept with the present form of dressing machine, thereby thoroughly covering and firmly planting the seed with excellent results. It has been found that a very small percentage of the seed is obviously wasted, by being exposed to the sun or drying winds and the birds. In treating the turf in this manner it has been found that the very highest percentage of germination is possible at a relatively low cost, and without inconvenience. The particular form of coupling for the brush units, enables the brush units to swing around when turning, namely independent of the chassis or frame, so that short turning may be easily accomplished without very much difficulty.

The levers 28 have hand grip operated dogs 28ª for engagement with the teeth of the segments, in order to hold the levers in different adjusted positions.

The invention having been set forth, what is claimed as being useful is:

1. In a soil or turf renovating brush harrow, a frame, supporting wheels therefor, a harrow brush universally connected to said frame, and means for raising and lowering said brush.

2. In a soil or turf renovating brush harrow, a frame, supporting wheels therefor, a plurality of harrow brushes, each universally connected to said frame, each harrow brush comprising a brush frame, relatively straight brush branches having their body portions bunched and engaged with the brush frame, and clamps for clamping the body portions of the brush branches to the brush frame.

3. In a soil or turf renovating brush harrow, a frame, supporting wheels therefor, a plurality of harrow brushes, each universally connected to said frame, each harrow brush comprising a brush frame, relatively straight brush branches having their body portions bunched and engaged with the brush frame, and clamps for clamping the body portions of the brush branches to the brush frame, and means for raising and lowering the plurality of brushes.

4. In a soil or turf renovating brush harrow, a frame, supporting wheels therefor, a plurality of brush units, each unit being universally connected to said frame, each unit comprising a plurality of brushes, a brush frame having brush engaging bars, relatively straight brush branches having their body portions engaging the edges of the brush engaging bars, means connected to the brush engaging bars passing upwardly through the stems of the brush branches, a plurality of bars receiving said means and being clamped against the body portions of the brush branches to hold them securely to the brush frame.

5. In a soil or turf renovating brush harrow, a frame, supporting wheels therefor, a plurality of brush units, each unit being universally connected to said frame, each unit comprising a plurality of brushes, a brush frame having brush engaging bars, relatively straight brush branches having their body portions engaging the edges of the brush engaging bars, means connected to the brush engaging bars passing upwardly through the stems of the brush branches, a plurality of bars receiving said means and being clamped against the body portions of the brush branches to hold them securely to the brush frame, and means for raising and lowering the brush units, said means including means for holding the raising and lowering means in different adjusted positions.

6. In a soil or turf renovating brush harrow, a frame, supporting wheels therefor, a plurality of brush units, each unit being universally connected to the frame, whereby it may be raised and lowered, and whereby it may swing laterally, whereby each unit may be disposed at an angle to the frame, the adjacent ends of the units subsequently overlying each other, whereby the harrow frame may turn in a small space, and means for raising and lowering said brush units individually and having a mechanism for holding said means in different adjusted raised positions.

7. In a soil or turf renovating brush harrow, a frame, supporting wheels therefor, a plurality of brush units, each unit being universally connected to the frame, whereby it may be raised and lowered, and whereby it may swing laterally, whereby each unit may be disposed at an angle to the frame, the adjacent ends of the units subsequently overlying each other, whereby the harrow frame may turn in a small space, and means for raising and lowering said brush units individually and having a mechanism for holding said means in different adjusted raised positions, each brush unit comprising a brush supporting frame, brush branches having their body portions compact together and engaging the brush frame, clamping means for the body portions of the brush branches comprising clamping bars, edges of certain of which engaging the bodies of the brush branches, to secure them in place.

8. In a soil or turf renovating brush harrow, a frame, supporting wheels therefor, brush frames universally connected to the wheel supported frame for up and down and lateral movement, brush branches carried by each brush frame, a lever pivotally connected to the first frame, means for holding the lever in different adjusted positions, said universal connection including a rocking shaft, a fixed arm connected to said shaft, and means connecting said arm and said lever, whereby upon moving the lever the brush frame may be raised and lowered.

In testimony whereof I hereunto affix my signature.

BASIL B. BROOK.